March 10, 1970 E. A. LE GROS 3,499,560
SMOOTH TO COARSE-FACED PALLET TRANSFER
Filed Sept. 23, 1968

INVENTOR.
EMILE A. LE GROS
BY
his ATTORNEYS

United States Patent Office 3,499,560
Patented Mar. 10, 1970

3,499,560
SMOOTH TO COARSE-FACED PALLET TRANSFER
Emile Albert Le Gros, Stamford, Conn., assignor to Lever Brothers Company, New York, N.Y., a corporation of Maine
Filed Sept. 23, 1968, Ser. No. 761,549
Int. Cl. B65g 65/00
U.S. Cl. 214—301  13 Claims

ABSTRACT OF THE DISCLOSURE

As described herein, a unit load carrying smooth-faced reversible pallet is carried to a position adjacent a non-reversible coarse-faced pallet. A tapered plate is then moved to a position above the non-reversible coarse-faced pallet and the unit load is transferred to the tapered plate. Thereafter, with the unit load being fixed against lateral movement, the tapered plate is retracted from its position above the non-reversible coarse-faced pallet and the unit load is deposited onto the non-reversible coarse-faced pallet.

BACKGROUND OF THE INVENTION

The present invention relates to methods and apparatus for handling material and, more particularly, to methods and apparatus for automatically transferring unit loads of material from a smooth-faced unit load carrying member to a coarse-faced unit load carrying member.

In material handling operations, unit loads, which can be composed of any assortment of articles which are accumulated and then handled without breaking bulk, are carried on skids or pallets. Generally, pallets comprise two decks or faces separated by two or more lengthwise members called stringers. If a pallet is to be used with a low-lift truck, the bottom deckboards must be spaced or openings must be formed near both ends of the bottom deck so that the rollers of the truck's fork arms can drop to the floor when the pallet is being elevated. Pallets so constructed are called non-reversible pallets. On the other hand, pallets constructed with uniform and coextensive upper and lower decks are called reversible pallets. The terms "one-way," "two-way" and "four-way" used in connection with pallets refer to the number of edges of the pallet into which the fork arms of a lift truck can be inserted.

The double-deck feature of pallets makes them particularly suitable for multiple-tiering the unit loads. However, with respect to non-reversible pallets, which, because they are used with low-lift trucks, find extensive use both in the storage of unit loads in warehouses and for transportation of unit loads, creasing damage occurs to the supporting surfaces of the lower unit loads when the unit loads are stacked. This is true because, as above noted, the non-reversible pallets are formed with large openings in their bottom decks.

A solution to the above difficulty is to employ unit load carrying reversible pallets for storage and to transfer the unit loads onto non-reversible pallets prior to shipment. However, because of the coarse upper surfaces of the non-reversible pallets, tearing and similar damage occurs when the unit load is pushed across the surface of the coarse-faced pallet. Also, to be a viable solution the transfer operation must be automatically and inexpensively accomplished. It is apparent that the expense involved in manually implementing such a unit load transfer would far outweigh the savings brought about by the reduction in damage to the unit loads during storage.

SUMMARY OF THE INVENTION

Accordingly, it is an object of the present invention to provide a method and apparatus therefor for automatically transferring unit loads from a smooth-faced reversible pallet to a non-reversible coarse-faced pallet.

This and other objects of the present invention are accomplished by locating a load carrying first member adjacent a second member adapted to carry a load and moving a support member to a position adjacent the load carrying first member and over the second member. By effecting relative movement between the load and the first member, the load of material is transferred to the support member and by thereafter removing the support member from its engagement with the load and, at the same time, precluding movement by the load in the direction of movement by the support member, the load of material is deposited thereby onto the second member.

DESCRIPTION OF THE PREFERRED EMBODIMENT

Figure 1:
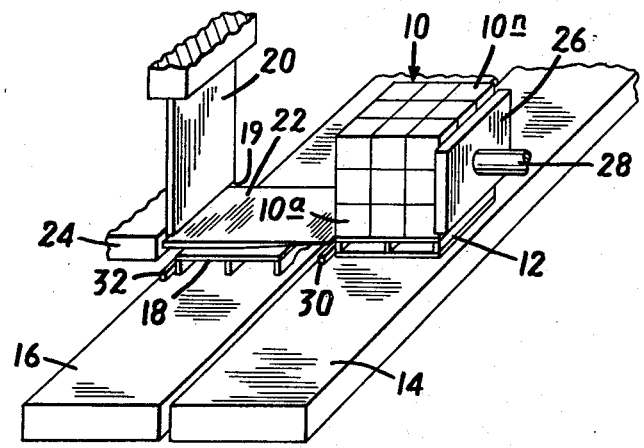
FIGURES 1, 2 and 3 illustrate a representative arrangement for transferring a unit load from a smooth-faced reversible pallet to a coarse-faced non-reversible pallet according to the invention during the various stages of the material transfer operation.
Figure 2:
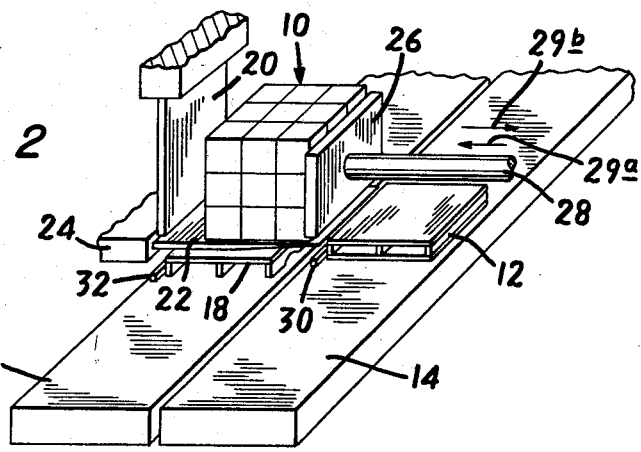
Figure 3:
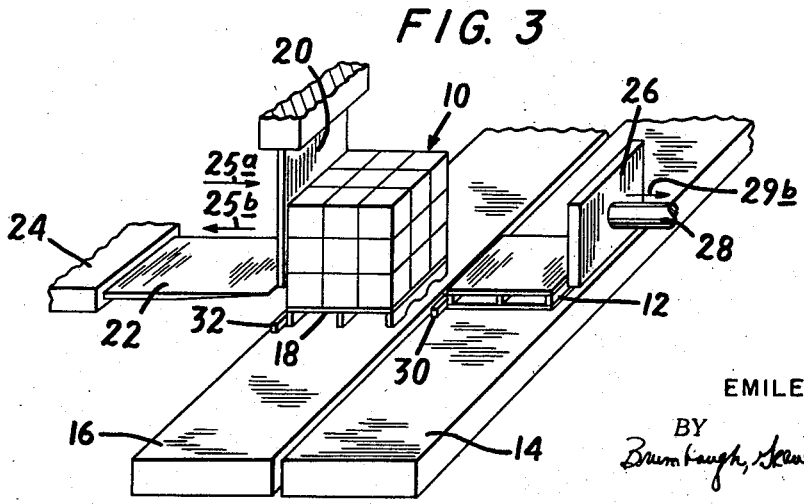

In the representative arrangement for transferring a unit load of material from a smooth-faced reversible pallet to a coarse-faced non-reversible pallet, as shown in FIGURES 1, 2 and 3, a unit load 10 composing, for example, horizontally and vertically stacked cases 10a–10n, is carried by a reversible pallet 12. The pallet 12, which may be of conventional construction, comprises top and bottom decks separated by lengthwise stringers. The surface of the top deck which frictionally engages the unit load 10 is smooth so as to facilitate the sliding of the unit load 10 therealong without damaging the unit load 10.

The pallet 12 is in turn carried by a loading or storage conveyor 14 which may, for example, extend around and through a warehouse, distribution center or manufacturing plant. As above noted, reversible pallets are particularly suited for multiple-tiering and, in practice, the unit load carrying pallet 12 may have been removed from a stack of such load carrying pallets and placed on the conveyor 14 in any well known and conventional manner.

Extending in parallel with the loading conveyor 14, at least at the point of the unit load transfer, is a shipping conveyor 16. As shown, the conveyor 14 extends in a plane somewhat above the vertical plane of the conveyor 16. This facilitates the transfer of the unit load 10, as will be explained in detail hereinafter. It shall be noted that, at the time of the unit load transfer, both the conveyors 14 and 16 are brought to at rest conditions. The movement by the conveyors 14 and 16 can be controlled manually in any known or conventional manner such as, for example, from a central control panel. Alternatively, the control can be automatic. For example, the energization of time delay circuits which control the conveyor motors may be controlled by switches responsive to the positioning of the pallets on the conveyors.

A coarse-faced non-reversible pallet 18, which may be, for example, of the conventional four-way non-reversible type which finds extensive use in standard palletized shipping programs, is carried by the conveyor 16. The non-reversible pallet 18 can be automatically deposited onto the conveyor 16 by commercially available pallet feeders and after pallet 12 has been emptied it can be removed by means of commercially available pallet stackers. As shown, the conveyors 14 and 16 are brought to rest when the pallets 12 and 18 are aligned. Extending through a clearance 19 between the non-reversible pallet 18 and a fixed retaining vertical plate 20 is a thin tapered support plate 22 carried by a movable support member 24 adapted for reciprocal movement toward (arrow 25a) and away (arrow 25b) from the vertical plate 20. The tapered plate 22 is dimensioned such that, in the start position (FIGURE 1), the plate extends above the coarse-faced non-reversible pallet 18 and the conveyor 16 with the thin end of the plate abutting the edge of the reversible pallet 12.

Moreover, the plate 22 is supported vertically by the member 24 such that the top surface of the plate is either coextensive with the top deck of the reversible pallet 12 or situated slightly below the top deck of the pallet 12. As above mentioned, the conveyor 12 is displaced vertically with respect to the conveyor 16 to facilitate the transfer of the unit load 10. The displacement may be equal to the greatest material thickness of the plate 22 and, preferably, is slightly greater than the material thickness of the plate 22.

Mounted adjacent the conveyor 14 and having its bottom edge located thereabove by a distance at least equal to the height of the reversible pallet 12 is a generally rectangularly shaped plate 26 carried by a rod 28 which is adapted for reciprocal movement toward (arrow 29a) and away (arrow 29b) from the tapered plate 22. As will be described in more detail herebelow, after the pallets 12 and 18 are aligned and the conveyors 14 and 16 brought to at rest conditions, the rod 28 is actuated, either manually or automatically, and drives the plate 26 against the unit load 10 to transfer the unit load from the pallet 12 to the tapered plate 22. A pair of stop members 30 and 32 are mounted along the edges of the conveyors 14 and 16, respectively. The stop members 30 and 32 preclude lateral movement by the pallets 12 and 18 respectively when the unit load 10 is transferred to the tapered plate 22 and when the tapered plate 22 is retracted from its frictional engagement with the unit load 10, respectively.

In operation, the unit load carrying smooth-faced reversible pallet 12 is placed onto the conveyor 14 and transported thereby to a position of alignment with the coarse-faced non-reversible pallet 18 carried by the conveyor 16 (FIG. 1). At the point of pallet alignment, the conveyors 14 and 16 are temporarily rendered inoperative either automatically or manually. Thereupon, the support member 24 is actuated and the tapered plate 22 is driven thereby to the right as indicated by arrow 25a from a position to the left of the vertical plate 20 (FIG. 3) through the clearance 19 and to a position above the reversible pallet 18 and in alignment with the unit load 10. As shown in FIGURE 1, at this position the thin end of the plate 22 abuts the reversible pallet 12. As an alternative mode of operation, the support member 24 may be actuated to place the tapered plate above the conveyor 16 prior to the alignment between the reversible pallet 12 and non-reversible pallet 18.

Referring to FIGURE 2, the rod 28 is then operated and drives the plate 26 to the left as indicated by arrow 29a and against the unit load 10. The rod continues its movement until the plate 26 has transferred the entire unit load 10 onto the tapered plate 22. Preferably, the rod 28 has a fixed lateral movement such that movement by the plate 26 terminates when the unit load 10 has been transferred to the plate 22. In any event, the fixed vertical plate 20 precludes any further movement by the unit load 10 along the surface of the plate 22 after it has been moved to a position on the plate directly above the non-reversible pallet 18. The stop member 30 mounted along the edge of the conveyor 14 precludes movement by the pallet 12 during the unit load transfer operation notwithstanding its frictional engagement with the unit load 10.

As shown in FIGURE 3, the support member 24 is then operated and the tapered plate 22 is driven laterally to the left as indicated by the arrow 25b. As the tapered plate 22 is retracted from its frictional engagement with the unit load 10, the unit load 10 is deposited onto the non-reversible pallet 18. At the same time, the rod 28 is actuated and the plate 26 is driven to the right as indicated by the arrow 29b until the plate reaches a non-operative position near the edge of the conveyor 14. It may be noted that because of the tapered configuration of the plate 22, the unit load is gradually and gently deposited onto the non-reversible pallet 18. Also, the unit load 10 is precluded from moving with the tapered plate 22 by the fixed vertical plate 20. After the unit load 10 is deposited onto the pallet 18, the conveyors 14 and 16 are rendered operative to convey the pallets 12 and 18 to storage and shipping areas, respectively, and to bring a second unit load carrying smooth-faced reversible pallet and a second coarse-faced non-reversible pallet into alignment.

Although the invention has been described herein with reference to a specific embodiment, many modifications and variations therein will readily occur to those skilled in the art. For example, for the purpose of reducing the vertical distance between the non-reversible pallet and the tapered plate, a separate element may be provided to force the non-reversible pallet against the tapered plate prior to the retraction of the tapered plate. In the alternative, a device may be provided to tilt the tapered plate downwardly as the plate is retracted. Also, instead of pushing the unit load off the reversible pallet, a non-reversible pallet may be placed beneath a load carrying reversible pallet and, thereafter, the reversible pallet is pushed out of its frictional engagement with the unit load to deposit the unit load onto the non-reversible pallet. Accordingly, all such variations and modifications are included within the intended scope of the invention as defined by the following claims.

What is claimed is:

1. A method of automatically transferring a load from a first unit load carrying member to a second member comprising the steps of:
   (a) locating a load carrying first member adjacent a second member;
   (b) moving a support member to a position adjacent the load carrying first member and above the second member;
   (c) effecting relative movement between the load and the first member to transfer the load to the support member; and
   (d) removing the support member from its engagement with the load and, concurrently therewith, precluding movement by the load in the direction of movement by the support member, to deposit thereby the load onto the second member.

2. The method according to claim 1 wherein the first member comprises a smooth-faced unit load carrying member and the second member comprises a coarse-faced member.

3. The method according to claim 1 wherein the first member comprises a smooth-faced reversible pallet and the second member comprises a coarse-faced non-reversible pallet.

4. The method according to claim 3 wherein the step of effecting relative movement between the load and the reversible pallet comprises pushing the load along and off the deck of the reversible pallet onto the support member.

5. The method according to claim 4 comprising the further step of precluding movement by the reversible pallet in the direction of movement by the load.

6. The method according to claim 5 comprising the further step of precluding movement by the non-reversible pallet in the direction of removement by the support member.

7. The method according to claim 6 wherein the support member comprises a thin tapered plate and wherein the thin tapered plate is moved to a position over the non-reversible pallet with the thin edge of the plate abutting the reversible pallet.

8. The method according to claim 7 comprising the further step of providing a vertical displacement between the reversible pallet and the non-reversible pallet equal to at least the greatest material thickness of the thin tapered plate.

9. Apparatus for transferring a unit load from a first smooth-faced member to a second coarse-faced member comprising for conveying a unit load carrying smooth-faced first member and a second coarse-faced member to positions whereat the members are adjacent, a support plate mounted for reciprocating movement to a position above the second member and adapted to receive the unit load when in its position above the second member deposit the unit load onto the second member when moved away from its position above the second member, a pusher member mounted adjacent an edge of the unit load carrying first member and adapted for reciprocating movement toward and away from the support plate for pushing the unit load along and off the surface of the first member and onto the support plate, and control means including means for controlling the reciprocating movement by the support plate and the pusher member and means for controlling the operation of the conveying means.

10. Apparatus according to claim 9 wherein the first member comprises a smooth-faced reversible pallet and the second member comprises a coarse-faced non-reversible pallet.

11. Apparatus according to claim 10 further comprising a fixed vertical plate spaced above an edge of the second pallet and spaced above the support plate for precluding movement by the transferred unit load in the direction of movement by the support plate away from its position above the second pallet.

12. Apparatus according to claim 11 wherein the conveying means comprises a first conveyor member for carrying the unit load carrying reversible pallet and a second conveyor member for carrying the non-reversible pallet, the second conveyor situated below the first conveyor member at least at the positions whereat the pallets are adjacent by a distance at least as great as the greatest material thickness of the support plate.

13. Apparatus according to claim 12 wherein the support plate comprises a thin tapered plate and wherein there are further provided first stop means mounted on the first conveyor member for precluding movement by the reversible pallet in the direction of movement by the pusher member toward the thin tappered plate and second stop means mounted on the second conveyor for precluding movement by the non-reversible pallet in the direction of movement by the thin tapered plate away from its position above the non-reversible pallet.

References Cited

UNITED STATES PATENTS 3,269,565   8/1966   Kemp. _____ 214—301 X

HUGO O. SCHULZ, Primary Examiner

U.S. Cl. X.R.

214—152